(12) United States Patent
Watanabe et al.

(10) Patent No.: US 10,508,439 B2
(45) Date of Patent: Dec. 17, 2019

(54) ROTARY INERTIA MASS DAMPER

(71) Applicant: THK CO., LTD., Tokyo (JP)

(72) Inventors: Yoshihito Watanabe, Tokyo (JP); Ryoji Tomono, Tokyo (JP); Takusho Nakamura, Tokyo (JP); Makoto Nakamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/770,836

(22) PCT Filed: Oct. 19, 2016

(86) PCT No.: PCT/JP2016/080908
§ 371 (c)(1),
(2) Date: Apr. 25, 2018

(87) PCT Pub. No.: WO2017/073420
PCT Pub. Date: May 4, 2017

(65) Prior Publication Data
US 2018/0305922 A1    Oct. 25, 2018

(30) Foreign Application Priority Data

Oct. 29, 2015    (JP) .................................. 2015-212777

(51) Int. Cl.
*F16F 15/02*    (2006.01)
*F16F 7/10*    (2006.01)
(Continued)

(52) U.S. Cl.
CPC ............. *E04B 1/985* (2013.01); *E04H 9/023* (2013.01); *F16F 7/10* (2013.01); *F16F 7/1022* (2013.01);
(Continued)

(58) Field of Classification Search
CPC .. E04B 1/985; E04H 9/023; F16F 7/10; F16F 7/1022; F16H 25/12
See application file for complete search history.

(56) References Cited

U.S. PATENT DOCUMENTS 4,289,218 A * 9/1981 Urano ..................... F16L 3/202
                                                          188/134
4,407,395 A * 10/1983 Suozzo .................. F16L 3/202
                                                          188/134
(Continued)

FOREIGN PATENT DOCUMENTS

JP    2005-9565 A    1/2005
JP    2010-19347 A   1/2010
(Continued)

OTHER PUBLICATIONS

International Search Report dated Nov. 15, 2016, issued in counterpart International Application No. PCT/JP2016/080908 (1 page).

*Primary Examiner* — Thomas J Williams
*Assistant Examiner* — James K Hsiao
(74) *Attorney, Agent, or Firm* — Westerman, Hattori, Daniels & Adrian, LLP

(57) ABSTRACT

To provide a rotary inertia mass damper, which is capable of reducing an axial reaction force that is generated due to vibration having an excessive acceleration to the extent possible when the vibration is input, and of preventing breakage of the damper itself or a construction, provided is a rotary inertia mass damper, including: a first coupling portion, which is fixed to a first structure; a second coupling portion, which is coupled to a second structure; a screw shaft, which has one axial end connected to the first coupling portion and retained so as to be non-rotatable; a fixed barrel, which has a hollow portion for receiving the screw shaft, and is connected to the second coupling portion; and a rotary body, which is retained so as to be freely rotatable relative (Continued)

to the fixed barrel, is threadedly engaged with the screw shaft, and is configured to reciprocally rotate in accordance with advancing and retreating movement of the screw shaft relative to the fixed barrel. A torque limiting member is provided between an axial end of the screw shaft and the first coupling portion, and is configured to, when a rotational torque that exceeds a predetermined value is applied to the screw shaft, allow rotation of the screw shaft relative to the first coupling portion to reduce a rotation angle of the rotary body.

3 Claims, 3 Drawing Sheets

(51) Int. Cl.
E04B 1/98 (2006.01)
F16F 15/023 (2006.01)
E04H 9/02 (2006.01)
F16H 25/20 (2006.01)
F16F 9/12 (2006.01)

(52) U.S. Cl.
CPC ............ *F16F 15/02* (2013.01); *F16F 15/023* (2013.01); *F16F 15/0235* (2013.01); *F16F 9/12* (2013.01); *F16F 2230/24* (2013.01); *F16F 2232/06* (2013.01); *F16H 25/20* (2013.01)

(56) References Cited

U.S. PATENT DOCUMENTS

| | | | | |
|---|---|---|---|---|
| 4,431,093 A * | 2/1984 | Yang | ............... | F16F 7/1022 188/129 |
| 4,536,114 A * | 8/1985 | Belew | ............... | B64G 1/641 244/118.1 |
| 5,168,967 A * | 12/1992 | Abiru | ............... | E04B 1/985 188/378 |
| 6,230,450 B1 * | 5/2001 | Kuroda | ............... | E04H 9/02 188/322.5 |
| 6,385,917 B1 * | 5/2002 | Konomoto | ............ | E04H 9/021 52/167.1 |
| 6,499,573 B1 * | 12/2002 | Konomoto | ............ | F16F 9/103 188/290 |
| 6,510,660 B1 * | 1/2003 | Michioka | ............ | E04H 9/02 52/1 |
| 8,312,783 B2 * | 11/2012 | McKay | ............... | B64C 13/28 244/99.2 |
| 9,494,208 B2 | 11/2016 | Watanabe et al. | | |
| 2009/0108510 A1 * | 4/2009 | Wang | ............... | F16F 7/1022 267/75 |
| 2009/0193916 A1 * | 8/2009 | Watanabe | ........... | F16H 25/2021 74/216.3 |
| 2013/0243517 A1 * | 9/2013 | Watanabe | ........... | F16C 11/0614 403/60 |
| 2014/0231197 A1 * | 8/2014 | Watanabe | ............ | F16F 9/12 188/290 |
| 2014/0360108 A1 * | 12/2014 | Fujiu | ............... | F16F 15/04 52/167.7 |
| 2015/0345134 A1 * | 12/2015 | Takahashi | ............ | F16F 9/535 52/167.2 |

FOREIGN PATENT DOCUMENTS

| | | |
|---|---|---|
| JP | 2011-144831 A | 7/2011 |
| JP | 2011-220430 A | 11/2011 |
| JP | 2014-20534 A | 2/2014 |

* cited by examiner

ROTARY INERTIA MASS DAMPER

TECHNICAL FIELD

The present invention relates to a rotary inertia mass damper, which is to be mounted to a construction such as a building, and is configured to reduce vibration applied to the construction.

BACKGROUND ART

As a rotary inertia mass damper, there has been known a rotary inertia mass damper disclosed in Patent Literature 1. The rotary inertia mass damper includes a screw shaft, a nut member, an outer barrel, and an additional weight. The screw shaft has a spiral male thread, and one end thereof is fixed to a construction. The nut member is threadedly engaged with the screw shaft. The outer barrel supports the nut member so as to be freely rotatable, and is fixed to the construction. Rotation is applied to the additional weight by the nut member.

When relative vibration generated in the construction due to an earthquake or the like is input between the screw shaft and the outer barrel, axial acceleration is caused in the screw shaft due to the vibration, and the axial acceleration is converted into angular acceleration of the nut member threadedly engaged with the screw shaft. The angular acceleration is transmitted, to the additional weight mounted to the nut member so that the nut member and the additional weight are rotated. The nut member and the additional weight integrally construct a rotary body, and a rotational torque generated in the rotary body is expressed by a product of an inertial moment of the rotary body and the angular acceleration. The rotational torque is reversely converted by the nut member and the screw shaft each time the axial acceleration of the screw shaft is reversed, and is applied to the screw shaft as an axial reaction force.

As described above, when a ball screw device in which the nut member is threadedly engaged with the screw shaft is used, and the vibration applied to the construction is converted into a rotary motion of the rotary body, the axial acceleration of the screw shaft is amplified with an amplification factor in accordance with a lead of the male thread of the screw shaft when the axial acceleration of the screw shaft is converted into the angular acceleration of the nut member. Further, also when the rotational torque generated in the rotary body is reversely converted into the axial reaction force of the screw shaft, the rotational torque is amplified with an amplification factor in accordance with the lead of the male thread. Therefore, in the rotary inertia mass damper, even when the mass of the rotary body is small, a large reaction force can be applied to the screw shaft. Thus, a significant vibration damping effect can be obtained while attaining downsizing of the device.

Meanwhile, the rotational torque generated in the rotary body is expressed, by the product of the inertial moment of the rotary body and the angular acceleration. Thus, when excessive axial acceleration is input from the construction to the screw shaft, and is amplified so that excessive angular acceleration is generated in the nut member, the rotational torque generated in the rotary body also becomes excessive. Therefore, when the rotational torque is reversely converted into the axial reaction force of the screw shaft as it is, there is a fear in that the screw shaft or the nut member may be broken. Further, even though the screw shaft and the nut member are not broken, when the excessive axial reaction force is applied from the rotary inertia mass damper to the construction, there is also a fear in that the construction may be broken by the axial reaction force.

In this regard, in the rotary inertia mass damper disclosed in Patent Literature 1, friction members are provided between the nut member and the additional weight, and an upper limit value is set for the rotational torque transmitted between the nut member and the additional weight. Therefore, when the rotational torque transmitted between the nut member and the additional weight exceeds the upper limit value set for the friction members, the additional weight is separated from the nut member, and the inertial moment of the rotary body is generated only by the nut member. With this, the rotational torque reversely converted into the axial reaction force of the screw shaft is suppressed, thereby preventing the excessive axial reaction force from being applied to the screw shaft.

CITATION LIST

Patent Literature

[PTL 1] JP 2011-144831 A

DISCLOSURE OF THE INVENTION

Problems to be Solved by the Invention

However, in the rotary inertia mass damper disclosed in Patent Literature 1, the friction members are provided between the nut member and the additional weight. Thus, even when the friction members slide so that the additional weight and the nut member are separated from each other, the nut member itself is rotated at angular acceleration obtained by amplifying the axial acceleration of the screw shaft. Therefore, the inertial moment of the rotary body is generated only by the nut member. However, when the excessive axial acceleration is input to the screw shaft, the excessive axial acceleration is amplified so that a high rotational torque is generated in the nut member. The rotational torque is reversely converted so that a large axial reaction force may be generated. Thus, there is a fear in that the construction may be broken by the axial reaction force.

Means for Solving the Problems

The present invention has been made in view of the problems described above, and has an object to provide a rotary inertia mass damper, which is capable of suppressing an axial reaction force that is generated as a result of input of vibration having an excessive acceleration to the extent possible, thereby being capable of preventing breakage of the damper itself or a construction.

That is, according to one embodiment of the present invention, it is premised that a rotary inertia mass damper includes: a first coupling portion, which is fixed to a first structure; a second coupling portion, which is coupled to a second structure; a screw shaft, which has a spiral thread groove formed in an outer peripheral surface of the screw shaft at a predetermined lead, and has one axial end connected to the first coupling portion and retained so as to be non-rotatable; a fixed barrel, which has a hollow portion for receiving the screw shaft, and is connected to the second coupling portion; and a rotary body, which is retained so as to be freely rotatable relative to the fixed barrel, is threadedly engaged with the screw shaft, and is configured to reciprocally rotate in accordance with advancing and retreating movement of the screw shaft relative to the fixed barrel, the rotary inertia mass damper being configured to damp vibration energy applied between the first structure and the second structure by imparting a rotation angle, which is uniquely determined by a change in distance between the first coupling portion and the second coupling portion and the lead of the screw shaft, to the rotary body. The rotary inertia mass damper further includes a torque limiting member, which is provided between the axial end of the screw shaft and the first, coupling portion, and is configured to, when a rotational torque that exceeds a predetermined value is applied to the screw shaft, allow rotation of the screw shaft relative to the first coupling portion to reduce a rotation angle of the rotary body.

Effects of the Invention

According to the present invention, when the rotational torque that exceeds the predetermined value is applied to the screw shaft due to the vibration applied between the first structure and the second structure, the torque limiting member provided between the first coupling portion and the axial end of the screw shaft functions so as to cause rotation of the screw shaft, thereby causing pseudo increase in lead of the male thread grooves formed in the screw shaft. With this, the angular acceleration generated in the rotary body can be reduced, and the axial reaction force, which is generated due to the input vibration, can be reduced, thereby being capable of preventing breakage of the damper itself or the construction.

MODE FOR CARRYING OUT THE INVENTION

Now, a rotary inertia mass damper according to the present invention is described in detail with reference to the attached drawings.

Figure 1:
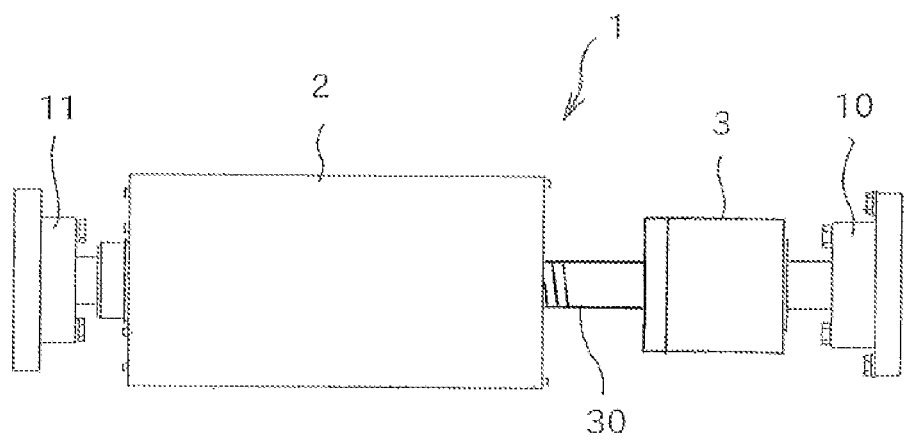
FIG. 1 is a schematic view for illustrating an example of a rotary inertia mass damper according to the present invention.

FIG. 1 is an illustration of an example of a rotary inertia mass damper to which the present invention is applied. The rotary inertia mass damper 1 includes a first coupling portion 10 and a second coupling portion 11 to be fixed to different portions (a first, structure and a second structure) in a system including a construction such as a building, a tower, or a bridge. The system including the construction encompasses a foundation ground to which the construction is fixed. For example, the system including the construction includes a case in which a damping apparatus is arranged in an inside of the construction, and also a case in which the first coupling portion 10 is fixed to the construction and the second coupling portion 11 is fixed to the foundation ground.

When the construction vibrates, axial relative displacement, is caused between the first coupling portion 10 and the second coupling portion 11 fixed to the different, portions in the system including the construction. The rotary inertia mass damper 1 according to the present invention is configured to convert the relative displacement into a rotary motion of a flywheel through intermediation of a screw conversion mechanism including a screw shaft and a nut member. A rotational torque generated in a rotary body including the flywheel and the nut member is reversely converted into an axial reaction force of the screw shaft through intermediation of the screw conversion mechanism, and vibration energy causing the relative displacement is damped by the axial reaction force.

The rotary inertia mass damper 1 roughly includes a damper body 2 and a torque limiting member 3 coupled in series to the damper body 2. The torque limiting member 3 is provided between the damper body 2 and the first coupling portion 10, and the damper body 2 is provided between the torque limiting member 3 and the second coupling portion 11.

Figure 2:
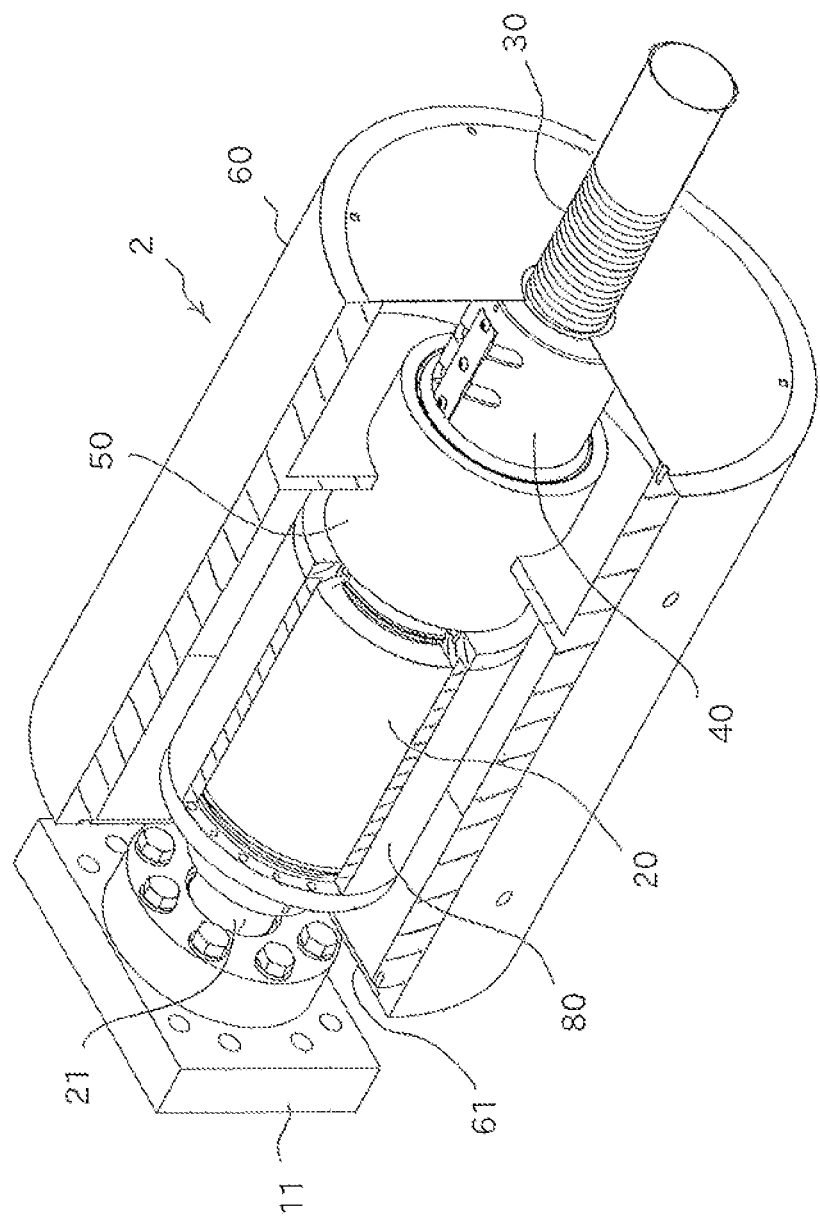
FIG. 2 is a perspective view for illustrating an example of a damper body of the rotary inertia mass damper.

FIG. 2 is a perspective view for illustrating an example of the damper body. The damper body 2 includes a fixed barrel 20, a screw shaft 30, a nut member 40, a bearing housing 50, a flywheel 60, and a rotary member 80. The fixed barrel 20 has a hollow portion, and is formed into a cylindrical shape. The screw shaft 30 is inserted into the hollow portion of the fixed barrel 20. The nut member 40 is threadedly engaged with the screw shaft 30 through intermediation of a large number of balls. The bearing housing 50 having a cylindrical shape is supported so as to be freely rot at able relative to the fixed barrel 20, and the nut member 40 is coupled to the bearing housing 50. The flywheel 60 having a cylindrical shape is fixed to the bearing housing 50. The rotary member 80 is supported so as to be freely rotatable relative to the fixed barrel 20, and is coupled to the flywheel 60.

The fixed barrel 20 is coupled to the second coupling portion 11 through intermediation of a ball joint 21. The ball joint 21 stops rotation of the fixed barrel 20 about the center axis while absorbing angular displacement of the center axis of the fixed barrel 20 with respect to the second structure. Further, the torque limiting member 3 is also coupled to the first coupling portion 10 through intermediation of a similar ball joint.

A bearing (not shown) is provided between the fixed barrel 20 and the bearing housing 50, and the bearing housing 50 is supported so as to be freely rotatable relative to the fixed barrel 20. Further, the nut member 40 is fixed to one axial end of the bearing housing 50. When the nut member 40 is rotated, the bearing housing 50 is rotated relative to the fixed barrel 20 together with the nut member 40.

The screw shaft 30 and the nut member 40 form a so-called ball screw device. Spiral thread grooves are formed in an outer peripheral surface of the screw shaft at a predetermined lead, and the large number of balls incorporated in the nut member roll on the thread grooves. With this, an axial linear motion and a rotary motion around the screw shaft can be mutually converted between the screw shaft 30 and the nut member 40. When the axial linear motion is applied to the screw shaft 30, the nut member 40 generates the rotary motion around the screw shaft 30. Meanwhile, when the rotary motion is applied to the nut member 40, the screw shaft 30 generates the axial linear motion.

An axial end of the screw shaft 30 is fixed to the first structure through intermediation of the torque limiting member 3. When relative displacement is caused between the first coupling portion 10 and the second coupling portion 11 by an earthquake or the like so that the screw shaft 30 generates an axial linear motion, the nut member 40 is rotated around the screw shaft 30 correspondingly, and the rotation is transmitted to the bearing housing 50. A transmission shaft 32 described later is provided on one end of the screw shaft 30, which protrudes from the flywheel 60, and the transmission shaft 32 is inserted into the torque limiting member 3.

The flywheel 60 having a cylindrical shape is provided on an outer side of the bearing housing 50. The flywheel 60 is fixed to the bearing housing 50 so as to be integrally rotated with the nut member 40 and the bearing housing 50. Further, the bearing housing 50 is freely rotatable relative to the fixed barrel 20, and thus the flywheel 60 is also freely rotatable relative to the fixed barrel 20.

Meanwhile, the rotary member 80 is provided on a periphery of the fixed barrel 20. The rotary member 80 is supported to an outer peripheral surface of the fixed barrel 20 through intermediation of a rotary bearing, and is coupled to the flywheel 60 through intermediation of an end plate 61 so that the rotary member 80 is rotated around the fixed barrel 20 along with rotation of the flywheel 60.

An inner peripheral surface of the rotary member 80 is opposed to the outer peripheral surface of the fixed barrel 20 through a small gap, and the gap is a sealed space for viscous fluid. Therefore, when the rotary member 80 is rotated, a shear resistance force is applied to the viscous fluid filled in the sealed space. Thus, energy of the rotary motion of the rotary member 80 as well as energy of the rotary motion of the flywheel 60 are damped.

Figure 3:
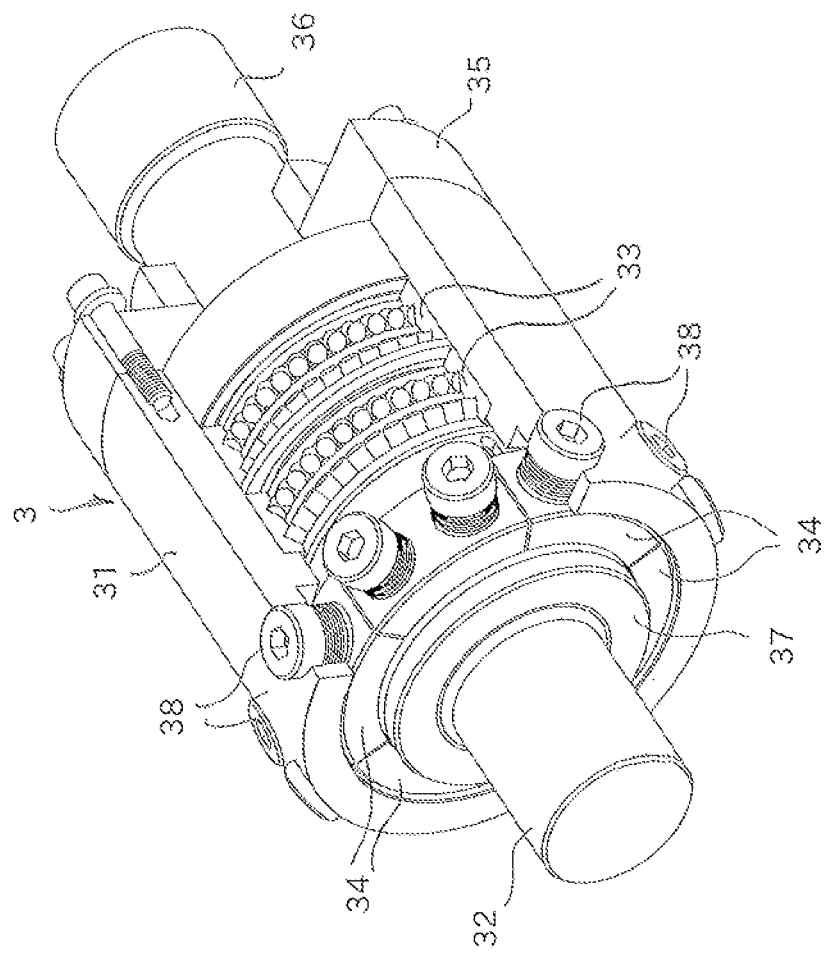
FIG. 3 is a perspective view for illustrating an example of a torque limiting member of the rotary inertia mass damper.

FIG. 3 is an illustration of an example of the torque limiting member 3. The torque limiting member 3 includes an outer cylinder member 31, the transmission shaft 32, a rotary bearing 33, and a plurality of friction members 34. The outer cylinder member 31 has a hollow portion, and is formed into a cylindrical shape. The transmission shaft 32 is inserted into the hollow portion of the outer cylinder member 31. The rotary bearing 33 is arranged in the hollow portion of the outer cylinder member 31, and retains the transmission shaft 32 in the hollow portion. The plurality of friction members 34 are pressed against the transmission shaft 32 to stop rotation of the transmission shaft 32 relative to the outer cylinder member 31.

One axial end of the hollow portion formed in the outer-cylinder member 31 is closed by a lid member 35. A coupling shaft 36 is fixed to the center of the lid member 35. Although not illustrated in FIG. 3, a ball stud is integrally provided on a distal end of the coupling shaft 36. The ball stud is engaged with the first coupling portion 10 through intermediation of a ball joint, and absorbs angular displacement of the rotary inertia mass damper 1 with respect to the first structure.

The transmission shaft 32 is inserted into the hollow, portion of the outer cylinder member 31. The transmission shaft is rotated integrally with the screw shaft 30 to transmit a rotational torque, and an axial load (axial force) is transmitted between the transmission shaft and the screw shaft. The transmission shaft may be formed integrally with the screw shaft, or may be coupled to the screw shaft through intermediation of a joint. In order to retain the transmission shaft 32 so as to be freely rotatable relative to the outer cylinder member 31 while bearing a radial load and a thrust load applied between the outer cylinder member 31 and the transmission shaft 32, a pair of double-row roller bearings are used as the rotary bearing 33. Each of the double-row roller bearings is a so-called angular contact bearing, and has two roller rows in which rotation axes thereof are crossed each other at an angle of 90°. The rotation axes of rollers of the respective roller rows are inclined with respect to the axial direction of the transmission shaft 32 at an angle of 45°. With this, a high axial load can be transmitted between the outer cylinder member 31 and the transmission shaft 32.

Further, the plurality of friction members 34 are arranged between the outer cylinder member 31 and the transmission shaft 32 so as to surround the transmission shaft 32, and are held in contact with a flange portion 37 protruding front an outer peripheral surface of the transmission shaft 32. The friction members 34 are arranged, so as to be immovable in a circumferential direction, of the outer cylinder member 31 and to be movable in a radial direction. A plurality of adjustment screws 38 are threadedly engaged with the outer cylinder member 31. When the adjustment screws 38 are fastened, the friction members 34 advance toward the flange portion 37 of the transmission shaft 32 so that a pressing force of the friction members 34 against the flange portion 37 can be adjusted. That is, a friction force in accordance with the fastening degree of the adjustment screws 38 is applied between the friction members 34 and the flange portion 37, and the friction members 34 function as a brake shoe for stopping the rotation of the transmission shaft 32.

Therefore, assuming a state in which a rotational torque is applied to the transmission shaft 32, when a friction force generated between the flange portion 37 and the friction members 34 is large enough to retain the transmission shaft 32 so as to be non-rotatable against the rotational torque, the transmission shaft is retained so as to be non-rotatable relative to the outer cylinder member 31. Conversely, when the friction force generated between the flange portion 37 and the friction members 34 is small, the friction force cannot, stop the rotation of the transmission shaft 32 against the rotational torque so that the transmission shaft 32 may be rotated relative to the outer cylinder member 31.

That is, the torque limiting member 3 functions as a torque limiter. When the rotational torque applied, to the transmission shaft, in other words, the rotational torque applied to the screw shaft is equal to or lower than a limit torque, set by the fastening of the adjustment screws, the transmission shaft 32 and the screw shaft 30 are retained without being rotated relative to the outer cylinder member 31. Meanwhile, when the rotational torque applied to the screw shaft 30 is higher than the limit torque set by the fastening of the adjustment screws 38, the transmission shaft 32 and the screw shaft 30 are rotated relative to the outer cylinder member 31.

In the rotary inertia mass damper 1 having the configuration described above, when relative vibration is applied between the first coupling portion 10 and the second coupling portion 11, the axial load is transmitted between the torque limiting member 3 and the screw shaft 30. Thus, the axial acceleration is imparted to the screw shaft 30, and the vibration causes an axial linear motion of the screw shaft 30 relative to the fixed barrel 20. In this case, axial acceleration "a", which is imparted to the screw shaft 30, is converted into angular acceleration "α" of the nut member 40 by Expression (1) described below. In Expression (1), $L_0$ represents the lead of the thread grooves formed in the screw shaft 30. Further, in the rotary body integrally including the nut member 40, the bearing housing 50, and the flywheel 60, a rotational torque is generated due to the angular acceleration "α". The rotational torque T is expressed by Expression (2) described below. In Expression (2), "I" represents an inertial moment of the rotary body including the nut member 40, the bearing housing 50, and the flywheel 60.

$$\alpha = (2\pi/L_0) \times a \quad (1)$$

$$T = I \times \alpha = I \times (2\pi/L_0) \times a \quad (2)$$

The rotational torque T generated in the rotary body is converted again by the nut member 40 into an axial inertia force Q. The axial inertia force Q is expressed by Expression (3) described below.

$$Q = T \times (2\pi/L_0) = (2\pi/L_0)^2 \times I \times a = M \times a \quad (3)$$

As expressed in Expression (3), the axial inertia force Q can be considered as a product of the mass $M=(2\pi/L_0)^2 \times I$, which is equivalent to the axial acceleration "a" in the axial direction, and the rotary inertia mass damper 1 can be regarded as a damper having the equivalent mass M in the axial direction.

As understood from Expressions (1) to (3), as the inertial moment I of the rotary body is reduced, or the lead $L_0$ of the screw shaft 30 is increased, the mass M equivalent in the axial direction is reduced. Assuming that, the axial acceleration, which is imparted to the screw shaft 30, is constant, the rotational torque T applied to the rotary body and the axial reaction force applied to the screw shaft 30 and the fixed barrel 20 are reduced.

When the axial acceleration "a" is imparted to the screw shaft 30 so that the rotational torque T is generated in the rotary body (the nut member 40, the bearing housing 50, and the flywheel 60), as a counteraction, a reverse rotational torque as high as the rotational torque T is similarly applied to the screw shaft 30. The transmission shaft 32 inserted into the torque limiting member 3 is provided integrally with the screw shaft 30, and thus the rotational torque T is applied as it is to the transmission shaft 32 of the torque limiting member 3.

When the torque limiting member 3 as the torque limiter retains the transmission shaft 32 so as to be non-rotatable against the rotational torque T, that is, when a linear motion is caused with respect to the fixed barrel 20 without rotating the screw shaft 30, an rotation angle in accordance with the lead of the thread grooves of the screw shaft 30 is imparted to the rotary body.

In contrast, when the rotational torque T applied to the screw shaft 30 is so high that the torque limiting member 3 cannot retain the transmission shaft 32 so as to be non-rotatable, that is, when the screw shaft 30 is rotated relative to the fixed barrel 20, the screw shaft 30 performs an axial linear motion relative to the fixed barrel 20 while being rotated relative to the nut member 40. At this time, even when the axial movement amount of the screw shaft is the same, the rotation angle of the nut member 40 is reduced as compared to a case in which the screw shaft 30 is retained so as to be non-rotatable, and pseudo increase in lead $L_0$ of the screw shaft 30 occurs.

That is, in the rotary inertia mass damper 1 according to the first embodiment, in a case in which a rotational torque, that exceeds the limit torque set in the torque limiting 1 member 3 is applied to the screw shaft 30, when the screw shaft is rotated, the pseudo increase in lead $L_0$ of the screw, shaft occurs, thereby reducing the rotational torque T and the axial inertia force Q. In particular, as expressed in Expression (3), the axial inertia force Q is proportional to the reciprocal of the square of the lead $L_0$ of the screw shaft 30. Thus, when the lead $L_0$ is increased, the axial inertia force Q is significantly reduced.

Therefore, in a case in which a construction to which the rotary inertia mass damper 1 is mounted vibrates due to a massive earthquake or the like, and axial displacement with the excessive acceleration is caused between the first coupling portion 10 and the second coupling portion 11, when the screw shaft 30 is rotated, the rotational torque T applied to the rotary body is suppressed within a range of the limit torque set in the torque limiting member 3. As a result, the axial reaction force, which is applied from the rotary inertia mass damper to the construction, is also reduced.

The invention claimed is:

1. A rotary inertia mass damper, comprising:
a first coupling portion, which is fixed to a first structure;
a second coupling portion, which is coupled to a second structure;
a screw shaft, which has a spiral thread groove formed in an outer peripheral surface of the screw shaft at a predetermined lead, and has one axial end connected to the first coupling portion;
a fixed barrel, which has a hollow portion for receiving the screw shaft, and is connected to the second coupling portion; and
a rotary body, which is retained so as to be freely rotatable relative to the fixed barrel, is threadedly engaged with the screw shaft, and is configured to reciprocally rotate in accordance with advancing and retreating movement of the screw shaft relative to the fixed barrel, wherein
the rotary inertia mass damper is configured to damp vibration energy applied between the first structure and the second structure by imparting a rotation angle, which is uniquely determined by a change in distance between the first coupling portion and the second coupling portion and the lead of the screw shaft, to the rotary body,
the rotary inertia mass damper further comprises a torque limiting member, which is provided between an axial end of the screw shaft and the first coupling portion, and is configured to, when a rotational torque that exceeds a predetermined value is applied to the screw shaft, allow rotation of the screw shaft relative to the first coupling portion to reduce a rotation angle of the rotary body,
wherein the torque limiting member includes:
a coupling shaft, which is connected to the first coupling portion so as to be non-rotatable;
a transmission shaft, which is retained to the coupling shaft so as to be freely rotatable, and is retained to the screw shaft so as to be non-rotatable; and
friction members, which are held in pressure-contact with the transmission shaft to stop rotation of the transmission shaft relative to the coupling shaft,
wherein a rotary bearing configured to retain the transmission shaft so as to be freely rotatable has two roller rows in which rotation axes of rollers are cross each other at an angle of 90°, the rotation axes of the rollers of the respective roller rows being inclined with respect to an axial direction of the transmission shaft at an angle of 45°.

2. A rotary inertia mass damper, comprising:
a first coupling portion, which is fixed to a first structure;
a second coupling portion, which is coupled to a second structure;
a screw shaft, which has a spiral thread groove formed in an outer peripheral surface of the screw shaft at a predetermined lead, and has one axial end connected to the first coupling portion;
a fixed barrel, which has a hollow portion for receiving the screw shaft, and is connected to the second coupling portion; and
a rotary body, which is retained so as to be freely rotatable relative to the fixed barrel, is threadedly engaged with the screw shaft, and is configured to reciprocally rotate in accordance with advancing and retreating movement of the screw shaft relative to the fixed barrel, wherein
the rotary inertia mass damper is configured to damp vibration energy applied between the first structure and the second structure by imparting a rotation angle, which is uniquely determined by a change in distance between the first coupling portion and the second coupling portion and the lead of the screw shaft, to the rotary body, the rotary inertia mass damper further comprises a torque limiting member, which is provided between an axial end of the screw shaft and the first coupling portion, and is configured to, when a rotational torque that exceeds a predetermined value is applied to the screw shaft, allow rotation of the screw shaft relative to the first coupling portion to reduce a rotation angle of the rotary body, wherein the torque limiting member includes:
- a coupling shaft, which is connected to the first coupling portion so as to be non-rotatable;
- a transmission shaft, which is retained to the coupling shaft so as to be freely rotatable, and is retained to the screw shaft so as to be non-rotatable;
- a rotary bearing configured to retain the transmission shaft so as to be freely rotatable, and transmitted an axial load between the coupling shaft and the transmission shaft; and
- friction members, which are held in pressure-contact with the transmission shaft to stop rotation of the transmission shaft relative to the coupling shaft.

3. The rotary inertia mass damper according to claim 2, wherein the rotary bearing has two roller rows in which rotation axes of rollers are cross each other at an angle of 90°, the rotation axes of the rollers of the respective roller rows being inclined with respect to an axial direction of the transmission shaft at an angle of 45°.

* * * * *